United States Patent
Billy et al.

(10) Patent No.: US 6,178,774 B1
(45) Date of Patent: Jan. 30, 2001

(54) PROCESS AND PLANT FOR THE COMBINED PRODUCTION OF AN AMMONIA SYNTHESIS MIXTURE AND CARBON MONOXIDE

(75) Inventors: Jean Billy, Plessis Trevise; Daniele Fauroux, Limeil-Brevannes, both of (FR)

(73) Assignee: L'Air Liquide, Societe Anonyme pour l'Etude et l'Exploitation des Procedes Georges Claude, Paris Cedex (FR)

( * ) Notice: Under 35 U.S.C. 154(b), the term of this patent shall be extended for 0 days.

(21) Appl. No.: 09/252,661

(22) Filed: Feb. 19, 1999

(30) Foreign Application Priority Data

Feb. 20, 1998 (FR) .................................................. 98 02099

(51) Int. Cl.$^7$ .................................................. F25J 3/00
(52) U.S. Cl. .................. 62/620; 62/630; 62/920
(58) Field of Search .............................. 62/617, 620, 618, 62/630, 632, 631, 920

(56) References Cited

U.S. PATENT DOCUMENTS

| 4,478,621 | * | 10/1984 | Fabian ...................................... 62/630 |
| 4,636,334 | * | 1/1987 | Skinner et al. ....................... 252/377 |
| 5,295,356 | * | 3/1994 | Billy ....................................... 62/920 |
| 5,609,040 | * | 3/1997 | Billy et al. ............................. 62/622 |

FOREIGN PATENT DOCUMENTS

| 38 01 712 | 7/1989 | (DE) . |
| 0 092 770 | 11/1983 | (EP) . |

* cited by examiner

*Primary Examiner*—William Doerrler
(74) *Attorney, Agent, or Firm*—Young & Thompson

(57) ABSTRACT

In the process of the invention, an ammonia synthesis mixture and carbon monoxide are produced. The hydrogen is purified in a nitrogen-washing column (61). The carbon monoxide is recovered cryogenically from a first liquid fraction (51) collected at the base of the said washing column (61), in a medium-pressure stripping column (62), then in a low-pressure distillation column (63). A second liquid fraction (52) is drawn from a position intermediate between the base and head of the washing column (61).

18 Claims, 3 Drawing Sheets

PROCESS AND PLANT FOR THE COMBINED PRODUCTION OF AN AMMONIA SYNTHESIS MIXTURE AND CARBON MONOXIDE

FIELD OF THE INVENTION

The present invention relates to the combined production of an ammonia synthesis mixture ($N_2+3H_2$) and carbon monoxide, as well as to a plant for such combined production.

BACKGROUND OF THE INVENTION

Conventionally, carbon monoxide is obtained during the steam reforming or partial oxidation of hydrocarbons. It is possible to produce highly pure carbon monoxide with such units by using conventional purification techniques. These include cryogenic processes such as partial condensation or washing with liquid methane; further processes employed for purification are absorption processes, such as the Tenneco Chemicals COSORB process, or adsorption processes (Pressure Swing Adsorption or PSA).

In particular, carbon monoxide is produced during preparation of the synthesis mixture used for the synthesis of ammonia, when the hydrogen is obtained by partial oxidation of hydrocarbons or coal. Such a conventional process of preparing the synthesis mixture is illustrated in the diagram in FIG. 1 and will be described in brief below:

After removal of the soot at 1, and removal of the hydrogen sulphide at 2, from the mixture delivered by the step of partially oxidizing hydrocarbon or coal at 3, step 4 of converting the CO changes the majority of the CO present, under the action of steam, into carbon dioxide ($CO_2$) while producing hydrogen.

After removal of $CO_2$ by absorption at 5, the gas mixture is subjected to a cryogenic step 6 of washing with nitrogen, which provides the synthesis mixture ($N_2+3H_2$) as well as a residual gas containing essentially carbon monoxide, hydrogen, methane and nitrogen.

FIG. 1 also represents the other operations in the synthesis of ammonia: air distillation at 7, providing the oxygen needed for the partial oxidation 3 and the nitrogen needed for the washing 6; $NH_3$ synthesis proper at 8, from the synthesis mixture output by step 6, compressed at 9; steam expansion in a turbine 10 to drive the compressor 9; treatment of the hydrogen sulphide output by step 2, at 11, by a Claus process to produce sulphur, and various heat exchangers 12 to 14.

In the prior art, the residual gas from the nitrogen-washing step 6 is burned.

A process for production of carbon monoxide, which makes it possible in the particular case above to utilize the residual gas rich in carbon monoxide is known from document EP-A-0,092,770. The residual gas is then used as feed mixture for the carbon monoxide production process. One of the processes described in that patent application includes a step of washing with methane in order to separate the hydrogen from a mixture also comprising methane, carbon monoxide and nitrogen. The condensate thus produced is distilled in a first distillation column in order to separate methane from the rest of the mixture. The gas from the head of this first column, mainly containing carbon monoxide, is distilled in a second distillation column in order to extract the nitrogen and the hydrogen remaining, the pure carbon monoxide being drawn off from the base of this column.

The carbon monoxide is then used as a coolant for the head condensers of the first and second columns.

A process for production of carbon monoxide from the residual gas, rich in carbon monoxide, output by a nitrogen-washing unit is also described in Patent Application EP-A-0 676 373.

To date, it has thus been possible to produce carbon monoxide by using the residual gas from a nitrogen-washing unit as the feed mixture for a separate carbon monoxide production unit, thus utilizing this residue which in the past was simply burned.

SUMMARY OF THE INVENTION

The object of the present invention is to provide a process for the production of carbon monoxide with reduced energy consumption and lower investment cost.

Another object is to provide carbon monoxide having high purity suitable for other production processes.

A further object is to provide such a process which can be integrated with the purification of the hydrogen intended for the production of the ammonia synthesis mixture.

An additional object of the invention is to provide a plant for implementing such a process.

To this end, the present invention relates to a process for combined production of an ammonia synthesis mixture and carbon monoxide, of the type comprising the production of an ammonia synthesis mixture ($N_2+3H_2$) from, on the one hand, hydrogen under high pressure purified, in a final step, by washing with nitrogen in a washing column and, on the other hand, a stream of nitrogen at high pressure, characterized by the steps consisting in:
  drawing off a first liquid fraction from the base of the nitrogen-washing column which is rich in carbon monoxide and lean in residual constituents including nitrogen, hydrogen and methane, and a second liquid fraction at an intermediate position between the base and head of the washing column, which is rich in nitrogen and lean in carbon monoxide,
  purifying, cryogenically, the carbon monoxide from the first fraction by a first separation under medium pressure in a stripping column separating the residual hydrogen at the head, and a second distillation under low pressure in a distillation column separating the carbon monoxide and the residual nitrogen at the head from the base mixture resulting from the first separation in the stripping column.

The invention also relates to a plant for the combined production of an ammonia synthesis mixture and carbon monoxide, of the type comprising cryogenic means for separating the constituents of a gas mixture containing essentially hydrogen and carbon monoxide as well as other constituents including nitrogen and methane, including a heat exchanger, a source capable of providing a stream of nitrogen at high pressure and a column for washing with liquid nitrogen, characterized in that:
  the nitrogen-washing column comprises means for drawing off liquid from a position intermediate between the base and the head of the column, and
  the plant furthermore comprises
  a medium-pressure stripping column provided with boiling means, producing a liquid fraction rich in carbon monoxide at the base, and hydrogen at the head,
  a line provided with expansion means, for conveying the base liquid fraction from the nitrogen-washing column to the stripping column,
  a low-pressure distillation column provided with boiling means and with a head condenser, producing a fraction rich in methane at the base and a fraction rich in carbon monoxide at the head, a line provided with expansion means, for conveying the base liquid fraction from the stripping column to an intermediate position on the distillation column.

The inventors have demonstrated that it is possible to produce carbon monoxide with suitable purity not by utilizing the residual gas output by the conventional final step of purifying hydrogen with a view to the production of an ammonia synthesis mixture, but in parallel with the production of this ammonia synthesis mixture by directly treating the liquid obtained at the base in the nitrogen-washing step.

They have thus demonstrated that it is possible to produce carbon monoxide, during the cryogenic purification of hydrogen intended for the production of ammonia, from the residue output by the nitrogen washing, without it being necessary to compress and warm it, as was the case in the prior art.

The inventors have shown, unexpectedly, that by degrading the (yield) efficiency of carbon monoxide at the initial step of its purification, carbon monoxide with purity suitable for its conventional applications can in the end be obtained with savings in energy and investment cost.

BRIEF DESCRIPTION OF THE DRAWINGS

An illustrative embodiment of the invention will now be described with reference to the appended drawings, wherein.

DETAILED DESCRIPTION OF THE INVENTION

Figure 1:
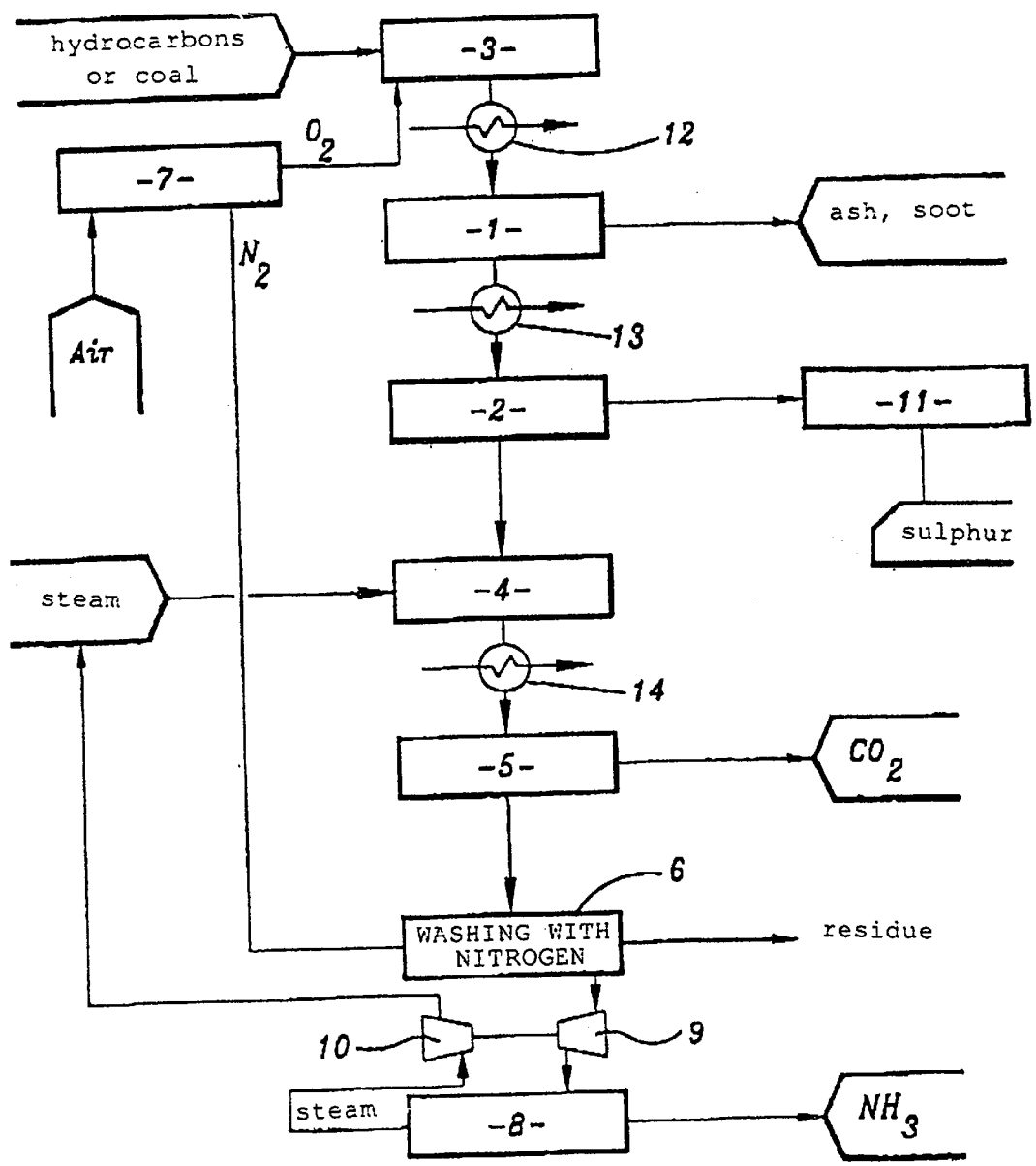
FIG. 1 is a conventional process of producing carbon monoxide.
Figure 2:
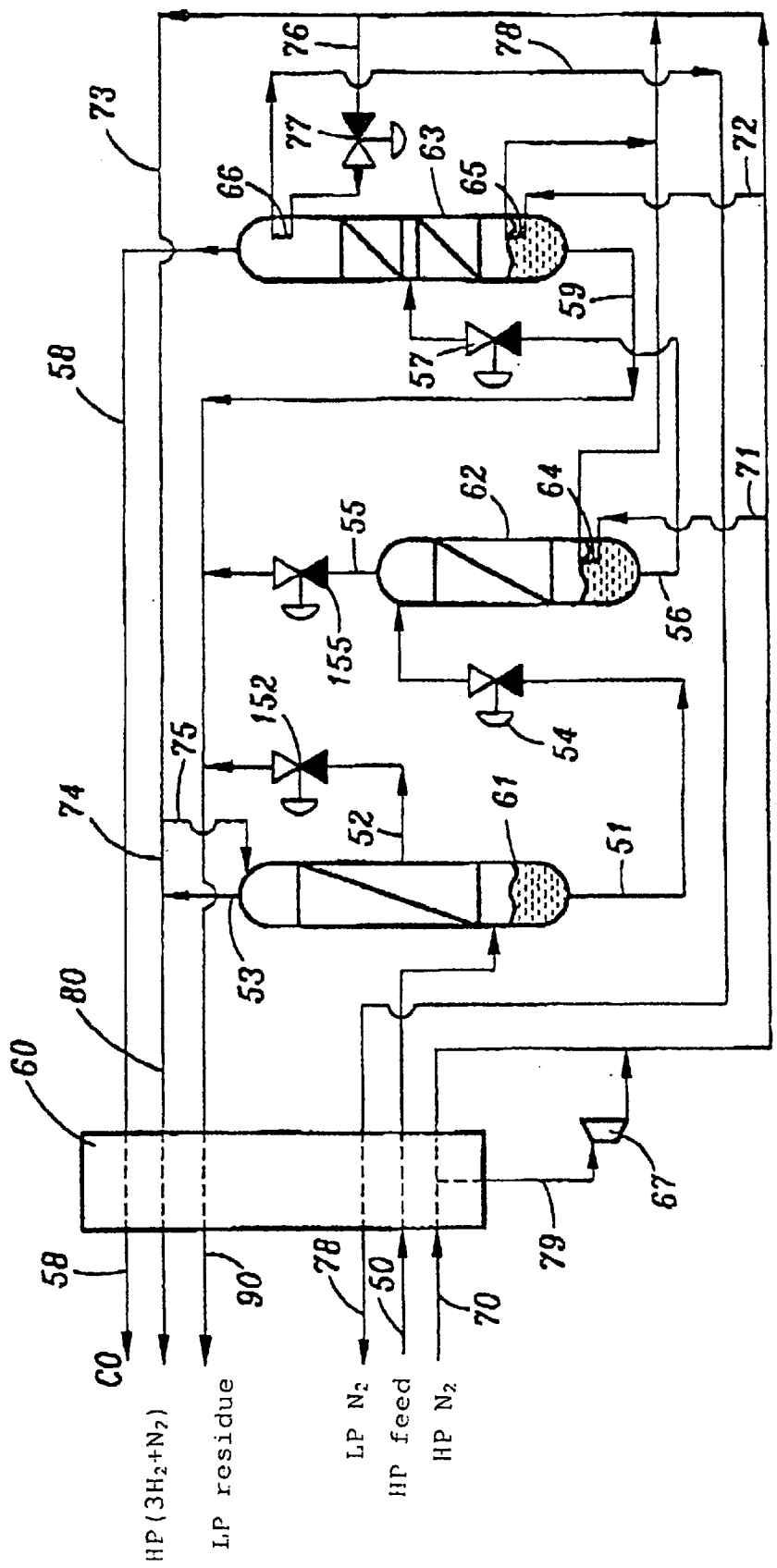
FIG. 2, which schematically represents a plant for combined production of an ammonia synthesis mixture and carbon dioxide according to the invention.

The plant represented in FIG. 2 replaces block 6 in FIG. 1.

It is intended, on the one hand, for the purification of hydrogen from a feed gas mixture 50 containing essentially hydrogen and carbon monoxide as well as other constituents including methane and nitrogen, in order to obtain a synthesis mixture that can be used for the production of ammonia and, on the other hand, for the production of carbon monoxide of high purity (at least 98%) directly from the residue output by the preceeding hydrogen purification.

The composition of the feed mixture of the plant 6 may vary depending on the type of process employed for generating the ammonia synthesis gas (steam reforming, partial oxidation, etc.).

The pressures referred to below are absolute pressures.

The plant 6 essentially comprises a heat exchanger 60 of the indirect countercurrent type, a liquid-nitrogen washing column 61, a stripping column 62 equipped with a base boiler 64, a distillation column 63 equipped with a base boiler 65 and a head condenser 66 as well as a turboexpander 67.

The plant operates in the following way:

The feed gas mixture 50, available under a high pressure of between 15 bar and 70 bar at the outlet of block 5, is cooled to a temperature of between −180° C. and −190° C. in the heat exchanger 60.

This mixture is then conveyed to the base of the washing columns 61 at the input of which it is in the partially condensed state.

It is then separated in the washing column 61 into a liquid fraction 51 collected at the column base, and a gas fraction.

The gas fraction, essentially consisting of hydrogen, is washed in the column 61 provided with plates or packing (not shown) with liquid nitrogen 75 conveyed under the high pressure to the column head, and leaves this column at the head in the flow 53 which essentially consists of hydrogen.

The hydrogen fraction 53 has a purity compatible with use in the synthesis of ammonia.

To this end, it has a nitrogen supplement 74 added to it in order to form the synthesis mixture 80 ($N_2+3H_2$) and is finally warmed to a ambient temperature in the heat exchanger 60.

Furthermore, a liquid fraction 52 is drawn off from a position intermediate between the base and head of the column 61. This fraction is rich in nitrogen and relatively lean in carbon monoxide.

The fraction 52 has its pressure reduced to a low pressure (typically 1.5 bar) in a pressure-reducing valve 152, then vaporized and warmed to ambient temperature in the heat exchanger 60 before being sent to a residual network 90 ("fuel gas").

For its part, the carbon monoxide is purified from the liquid fraction 51 collected at the base of the column 61.

The fraction 51 is lean in nitrogen and rich in carbon monoxide, and also contains other constituents present in the initial feed mixture 50. It typically contains at least 90% of the amount of carbon monoxide contained in the feed-gas mixture 50, and residual hydrogen and nitrogen together with other constituents including methane.

The fraction 51 is the direct source of the associated carbon monoxide production.

The carbon monoxide is purified in the following two steps:

The liquid fraction 51 is firstly rid of the residual hydrogen dissolved in it, by separation under medium pressure (typically 10 bar) in the stripping column 62 after having its pressure reduced using a pressure-reducing valve 54.

The separated hydrogen is collected at the head of the column 62 in the flow 55 which, after having its pressure reduced to the low pressure in a pressure-reducing valve 155, is warmed at 60 and sent to the residual network 90.

A liquid fraction 56 consisting essentially of carbon monoxide and also containing the residual nitrogen and the other constituents initially present in the feed mixture 50, including methane, is collected at the base of the column 62.

The fraction 56 is conveyed at the low pressure, after having its pressure reduced using a valve 57, to a distillation column 63 at an intermediate position on the column.

After separation in the column 63, a gas fraction 58, rich in carbon monoxide and also containing residual nitrogen, is collected at the column head. The $N_2/CO$ ratio in this fraction is no more than 2%.

This fraction 58 is warmed to ambient temperature in the heat exchanger 60 and provides the desired carbon monoxide of purity compatible with its use in other conventional production processes.

A liquid fraction 59 rich in methane is furthermore collected at the base of the column 63 and is sent, after warming at 60, to the residual network 90.

The separating power is provided by an open nitrogen cycle as described below:

Nitrogen at high pressure 70, typically at the pressure of the feed mixture 50, is cooled in the heat exchanger 60.

A portion of this high-pressure nitrogen, tapped off in the flows 71 and 72, is condensed in the base boilers 64 and 65 of the separation column 62 and 63 respectively.

The majority of this liquefied nitrogen 73 is fed into the washing column 61 by a flow 75 introduced at the head of the column.

Another portion 74 constitutes the nitrogen supplement for forming the synthesis mixture 80 ($N_2+3H_2$) by mixing with the head gas 53 from the column 61.

A small fraction of this liquefied nitrogen 76 moreover has its pressure reduced using a pressure-reducing valve 77 and vaporized at low pressure in the head condenser 66 of the separation column 63.

The nitrogen at low pressure (typically 2 bar) exiting the condenser 66 and warmed to form the flow 78 may supply a low-pressure nitrogen network or be recompressed before being recycled at 70 into the process.

The heat budget of the plant 6 is balanced by pressure-reduction, in a turbine 67, of a stream of nitrogen at high pressure 79 partially cooled in the exchanger 60, or optionally by vaporization of an external supplement of liquid nitrogen.

Figure 3:
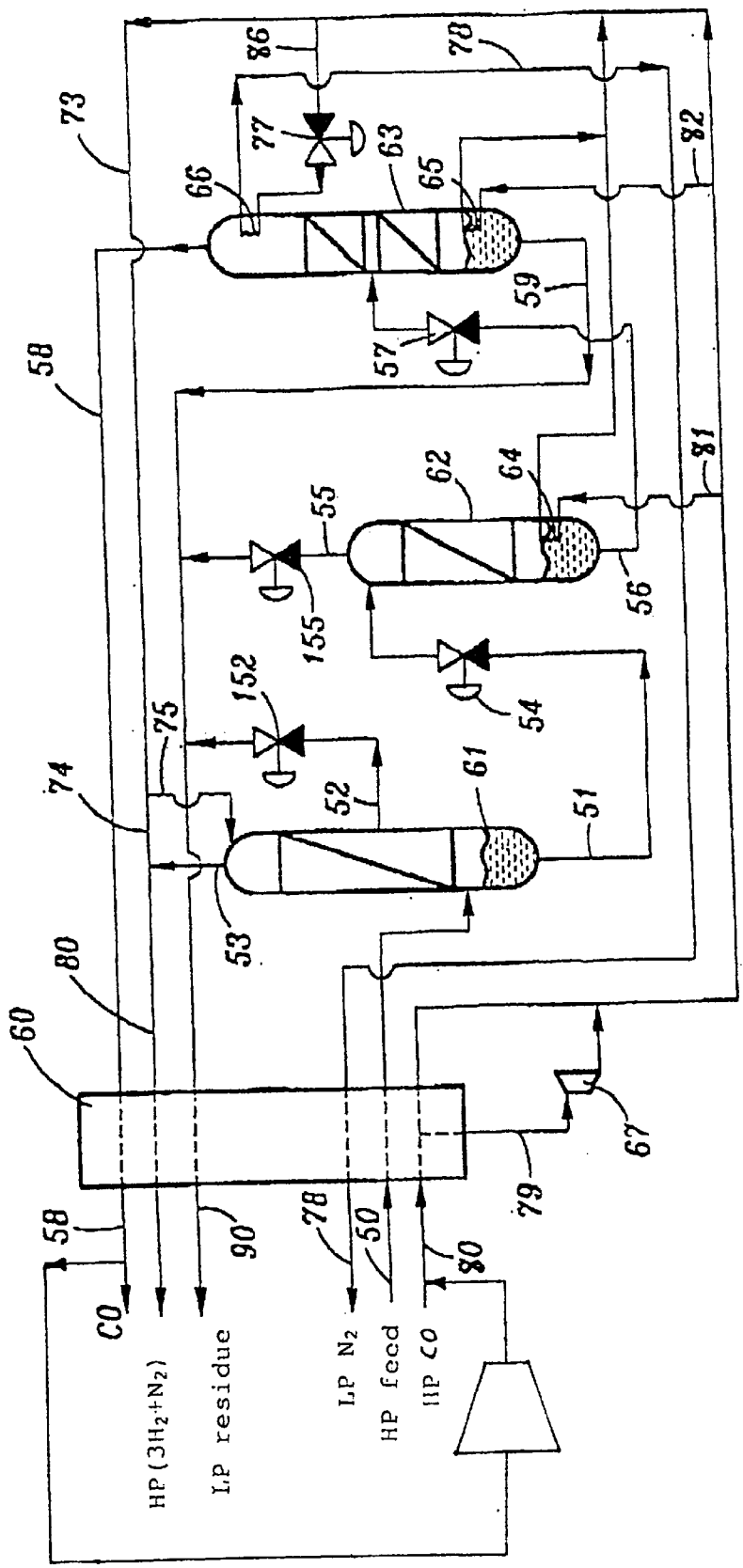
FIG. 3 represents an alternative embodiment of a plant for combined production of an ammonia synthesis mixture and carbon dioxide according to the invention.

According to an alternative embodiment of the invention depicted in FIG. 3, the separations are carried out by means of an open cycle whose fluid is carbon monoxide 80.

In this case, the carbon monoxide produced is used, after recompression of a stream taken from the fraction 58, to supply the base boilers 64 and 65 as well as the head condenser 66 of the separation columns 62 and 63, via flows 81, 82, 86 respectively, in a way similar to that described above with reference to the nitrogen flows 71, 72, 76.

The process according to the present invention makes it possible to reduce the energy consumption and the investment cost compared with known processes.

This is because it provides carbon monoxide production in parallel with the final purification of hydrogen for the production of the ammonia synthesis mixture, that is to say directly from the residual flow output by the nitrogen-washing step in the same cold box. The residual flow from this nitrogen-washing step has not been warmed, compressed and cooled to low temperature before purification of the carbon monoxide, as in the prior art mentioned above.

Furthermore, the process according to the invention does not provide separation of the nitrogen in an independent distillation step, but intermediate withdrawal during the washing with liquid nitrogen.

It has thus been demonstrated that, by degrading the carbon monoxide yield (loss during the intermediate withdrawal) in the initial step of washing with nitrogen, it is possible to produce both hydrogen with suitable purity for the production of an ammonia synthesis mixture and carbon monoxide with a purity of at least 98%, suitable for most of the applications for which it is conventionally intended.

The energy used to produce carbon monoxide and its characteristics were evaluated for the process of the invention by comparison with the known process, according to the following schemes:

Scheme 1 according to the prior art:
production of an ammonia synthesis mixture by washing with liquid nitrogen, in a first cold box, with a residue rich in carbon monoxide as by-product,
production of carbon monoxide by purifying the residue in a second cold box.

Scheme 2 according to the invention:
integrated production of an ammonia synthesis mixture and carbon dioxide, in the same cold box.

The feed gas has the following characteristics:

TABLE 1

| Composition | | mol % |
|---|---|---|
| $H_2$ | | 75.34 |
| $N_2$ | | 0.57 |
| CO | | 10.16 |
| $CH_4$ | | 12.79 |
| $C_2H_6$ | | 1.14 |
| flow rate | $m^3$[stp]/h | 66,480 |
| pressure | bar | 20.5 |

The following results were obtained:
Specific energy for production of 1 $m^3$ [stp] of carbon monoxide:
Scheme 1: 0.29 kWh/$m^3$[stp]
Scheme 2: 0.07 kWh/$m^3$[stp], i.e. about 4 times less.

The carbon monoxide produced has the following characteristics:

TABLE 2

| | | CO produced | |
|---|---|---|---|
| CO-rich residue | | Scheme 1 (known) | Scheme 2 (invention) |
| Composition mol % | | Composition mol % | |
| $H_2$ | 2.18 | $H_2$ <0.1 | <0.1 |
| $N_2$ | 1.48 | $N_2$ 3.5 | 3.5 |
| CO | 39.76 | CO 96.5 | 96.5 |
| $CH_4$ | 51.95 | $CH_4$ <5 ppmv | <5 ppmv |
| $C_2H_6$ | 4.63 | $C_2H_6$ — | |
| Flow rate $m^3$[stp]/h | 16,370 | 5442 | 5875 |
| Energy kW | | 1578 | 400 |

What is claimed is:

1. In a process for combined production of an ammonia synthesis mixture and carbon monoxide, comprising the production of an ammonia synthesis mixture ($N_2+3H_2$) from a) hydrogen under high pressure, purified in a final step by washing with nitrogen in a washing column, and b) a stream of nitrogen at high pressure, the improvement which comprises:

drawing off a first liquid fraction from the base of the nitrogen-washing column which is rich in carbon monoxide and lean in residual constituents including nitrogen, hydrogen and methane; and a second liquid fraction at an intermediate position between the base and head of the washing column, which is rich in nitrogen and lean in carbon monoxide;

cryogenically purifying, the carbon monoxide from the first liquid fraction by a first separation under medium pressure in a stripping column separating the residual hydrogen at the head, and a second distillation under low pressure in a distillation column separating the carbon monoxide and the residual nitrogen at the head from the base mixture resulting from the first separation in the stripping column.

2. The process according to claim 1, wherein a portion of the stream of nitrogen at high pressure is used as the cycle fluid of an open cooling cycle involved in the separation steps.

3. The process according to claim 2, wherein a portion of the stream of nitrogen at high pressure is cooled and used to supply base boilers respectively for the stripping and distillation columns.

4. The process according to claim 2, wherein a portion of the stream of nitrogen at high pressure is cooled, has its pressure reduced, and is used at low pressure to cool the head of the distillation column.

5. The process according to claim 4, wherein the low-pressure nitrogen stream delivered by the head condenser of the distillation column is compressed to the pressure needed for the production of the ammonia synthesis mixture, and is recycled as the cycle fluid of the open cooling cycle involved in the separation steps.

6. The process according to claim 1, wherein a portion of the stream of nitrogen at high pressure has its pressure reduced in a turbine to contribute to the refrigeration needed for the separation steps.

7. The process according to claim 1, wherein the stream of carbon monoxide produced is compressed and used as the cycle fluid of an open cooling cycle involved in the separation steps.

8. The process according to claim 7, wherein the compressed stream of carbon monoxide is used to supply base boilers respectively for the stripping and distillation columns.

9. The process according to claim 7, wherein the stream of carbon monoxide has its pressure reduced and used at low pressure to cool the head of the distillation column.

10. The process according to claim 9, wherein the stream of carbon monoxide at low pressure is compressed and recycled as the cycle fluid of the open cooling cycle involved in the separation steps.

11. The process according to claim 1, wherein carbon monoxide having a purity of at least 98% is produced.

12. In a plant for the combined production of an ammonia synthesis mixture and carbon monoxide comprising cryogenic means for separating the constituents of a gas mixture containing essentially hydrogen and carbon monoxide, as well as other constituents including nitrogen and methane, including a heat exchanger, a source capable of providing a stream of nitrogen at high pressure and a column for washing with liquid nitrogen, the improvement wherein:

the nitrogen-washing column comprises means for drawing off liquid from a position intermediate between the base and the head of the column, and the plant further comprises a medium-pressure stripping column provided with boiling means, producing a liquid fraction rich in carbon monoxide at the base, and hydrogen at the head;

a line provided with expansion means for conveying the base liquid fraction from the nitrogen-washing column to the stripping column;

a low-pressure distillation column provided with boiling means and with a head condenser, producing a fraction rich in methane at the base and a fraction rich in carbon monoxide at the head; and a line provided with expansion means for conveying the base liquid fraction from the stripping column to an intermediate position on the distillation column.

13. The plant according to claim 12, further comprising an open nitrogen cooling cycle supplied with nitrogen at high pressure intended for the production of the ammonia synthesis mixture.

14. The plant according to claim 12, wherein the boiling means of the stripping and the distillation columns comprise high-pressure nitrogen lines respectively connected to the stream of nitrogen at high pressure.

15. The plant according to claim 12, further comprising a feed line provided with expansion means connected to the stream of nitrogen at high pressure for supplying the low-pressure portion of the cooling cycle.

16. The plant according to claim 12, further comprising an open CO cooling cycle supplied with the carbon monoxide produced and connected to a cycle compressor.

17. The plant according to claim 12, wherein said plant is integrated into equipment for synthesizing ammonia whose means of production of the synthesis mixture comprise a first unit for partial oxidation of hydrocarbons or of coal, and a last unit for washing with nitrogen; said plant constituting the last unit for washing with nitrogen.

18. In a plant for combined production of an ammonia synthesis mixture and carbon monoxide, comprising the production of an ammonia synthesis mixture ($N_2+3H_2$) from a) a source of hydrogen under high pressure, purified in a final step by washing with nitrogen in a washing column, and b) a stream of nitrogen at high pressure; the improvement, wherein the plant further comprises:

means for drawing off a first liquid fraction from the base of the nitrogen-washing column which is rich in carbon monoxide and lean in residual constituents including nitrogen, hydrogen and methane; and a second liquid fraction at an intermediate position between the base and head of the washing column, which is rich in nitrogen and lean in carbon monoxide; and means for cryogenically purifying the carbon monoxide from the first liquid fraction by a first separation under medium pressure in a stripping column separating the residual hydrogen at the head, and a second distillation under low pressure in a distillation column separating the carbon monoxide and the residual nitrogen at the head from the base mixture resulting from the first separation in the stripping column.

* * * * *